(12) United States Patent
Yamashita

(10) Patent No.: US 11,951,810 B2
(45) Date of Patent: Apr. 9, 2024

(54) WINDSHIELD

(71) Applicant: NIPPON SHEET GLASS COMPANY, LIMITED, Tokyo (JP)

(72) Inventor: Hiromichi Yamashita, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 625 days.

(21) Appl. No.: 17/251,502

(22) PCT Filed: Jun. 3, 2019

(86) PCT No.: PCT/JP2019/021896
§ 371 (c)(1),
(2) Date: Dec. 11, 2020

(87) PCT Pub. No.: WO2019/239930
PCT Pub. Date: Dec. 19, 2019

(65) Prior Publication Data
US 2021/0155082 A1 May 27, 2021

(30) Foreign Application Priority Data

Jun. 12, 2018 (JP) ................................. 2018-111815

(51) Int. Cl.
*B60J 1/00* (2006.01)
*B60J 1/20* (2006.01)
(Continued)

(52) U.S. Cl.
CPC .................. *B60J 1/002* (2013.01); *B60J 1/20* (2013.01); *H05B 3/20* (2013.01); *H05B 3/86* (2013.01); *H05B 2203/031* (2013.01)

(58) Field of Classification Search
CPC .......... H05B 3/0042; H05B 3/84; H05B 3/86; H05B 2203/005; H05B 2203/031;
(Continued)

(56) References Cited

U.S. PATENT DOCUMENTS 5,182,431 A * 1/1993 Koontz ..................... H05B 3/84
219/547
5,208,444 A * 5/1993 Winter ..................... H05B 3/84
219/547

(Continued)

FOREIGN PATENT DOCUMENTS

DE 10136549 A1 2/2003
EP 0741502 A2 11/1996
(Continued)

OTHER PUBLICATIONS

European Communication pursuant to Article 94(3) EPC for European Application No. 19819313.8, dated Jun. 7, 2023.
(Continued)

*Primary Examiner* — Gregory A Blankenship
(74) *Attorney, Agent, or Firm* — Birch, Stewart, Kolasch & Birch, LLP

(57) ABSTRACT

Provided is a windshield including a glass body with a rectangular shape including a peripheral edge that includes a first side and a second side and a third side that meet the first side; and a heating element disposed at or near the peripheral edge of the glass body, the heating element heating the glass body for deicing. The glass body includes a first region extending along the first side, a second region located along the first side adjacent to the first region, and a third region located along the first side adjacent to the second region on an opposite side to the first region. The heating element is disposed at least in the first region and the second region, heats the first region to higher temperatures than the second region, and heats the second region to higher temperatures than the third region.

17 Claims, 13 Drawing Sheets

(51) Int. Cl.
*H05B 3/20* (2006.01)
*H05B 3/86* (2006.01)

(58) Field of Classification Search
CPC .. H05B 3/20; B60J 1/002; B60S 1/048; B60S 1/026
USPC ................................ 219/203, 522; 296/84.1
See application file for complete search history.

(56) References Cited

U.S. PATENT DOCUMENTS

| | | | |
|---|---|---|---|
| 5,824,993 A | 10/1998 | Chrysochoos et al. | |
| 6,703,586 B1* | 3/2004 | Kast | H05B 3/84 |
| | | | 219/203 |
| 10,723,318 B2* | 7/2020 | Ichida | H05B 3/86 |
| 11,716,792 B2* | 8/2023 | Mellor | H05B 3/86 |
| | | | 219/203 |
| 2004/0084432 A1* | 5/2004 | Schwartz | H05B 3/84 |
| | | | 219/203 |
| 2005/0089691 A1* | 4/2005 | Noguchi | B32B 17/10807 |
| | | | 428/435 |
| 2012/0005856 A1* | 1/2012 | Jones | B60S 1/3882 |
| | | | 15/250.07 |
| 2013/0161309 A1* | 6/2013 | Lisinski | B60S 1/048 |
| | | | 219/203 |
| 2014/0217080 A1* | 8/2014 | Hoke | B60H 1/00864 |
| | | | 219/203 |
| 2014/0374401 A1* | 12/2014 | Nakagawa | B32B 17/10302 |
| | | | 156/305 |
| 2016/0347028 A1 | 12/2016 | Kosaka et al. | |
| 2018/0176996 A1* | 6/2018 | Ichida | H05B 3/84 |
| 2021/0155082 A1* | 5/2021 | Yamashita | B60J 1/002 |
| 2023/0182445 A1* | 6/2023 | Bard | B32B 17/10293 |
| | | | 219/203 |
| 2023/0227004 A1* | 7/2023 | Chiba | B60S 1/026 |
| | | | 219/203 |

FOREIGN PATENT DOCUMENTS

| | | |
|---|---|---|
| JP | 4-283153 A | 10/1992 |
| JP | 8-244562 A | 9/1996 |
| JP | 10-1027 A | 1/1998 |
| JP | 2012-140086 A | 7/2012 |
| JP | 2014-125152 A | 7/2014 |
| JP | 2016-141320 A | 8/2016 |
| JP | 2016-222524 A | 12/2016 |
| WO | WO 93/18634 A1 | 9/1993 |

OTHER PUBLICATIONS

International Search Report, issued in PCT/JP2019/021896, PCT/ISA/210, dated Jul. 30, 2019.
Extended European Search Report for European Application No. 19819313.8, dated Feb. 2, 2022.

* cited by examiner

WINDSHIELD

TECHNICAL FIELD

The present invention relates to a windshield and particularly relates to a windshield for a vehicle, the windshield being provided with a deicer for a wiper.

BACKGROUND ART

Deicers are installed in the front windshield of a vehicle as a measure against wipers freezing to the windshield or being covered in snow. A deicer is a device that supplies power to a heating element such as a heating wire disposed on a glass body of a windshield and heats the glass body to melt ice, snow, and frost adhered to the glass body and the wiper. From the perspective of ensuring that the field of view of the driver is not blocked and giving an aesthetic appearance, the heating element is disposed in a park region of the wiper on a dark opaque shielding layer formed along the peripheral edge of the glass body.

The park region of the wiper is typically a region located to the right side along the lower side of the glass body as seen from outside the vehicle. The heating element is also disposed in an inverted region of the wiper, typically a region along the left side of the glass body as seen from outside the vehicle. The deicer described in Patent Literature 1 is of this type.

CITATION LIST

Patent Literature

Patent Literature 1: JP 2012-140086A

SUMMARY OF INVENTION

Technical Problem

When the heating element is disposed on the glass body as described above, there is little distance between the heating element and the peripheral edge of the glass body. Also, in recent years, to reduce weight, there has been a demand for a reduction in the size of the shielding layer along the lower side of the glass body. This demand is only growing. When the temperature gradient between the region where the heating element is disposed and the region where the heating element is not disposed is great, the thermal stress at the peripheral edge of the glass body at or near the boundary between the regions is great. This may result in the glass body being damaged. Note that this problem does not just pertain to vehicle windshields provided with a deicer and also pertains to glass bodies of various uses under conditions where the glass body is heated locally near the peripheral edge.

An object of the present invention is to provide a windshield capable of preventing damage to a glass body due to thermal stress caused by locally heating the glass body near the peripheral edge.

Solution to Problem

A windshield according to a first aspect of the present invention includes a glass body with a rectangular shape including a peripheral edge that includes a first side and a second side and a third side, the second side and the third side meeting the first side; and a heating element disposed at or near the peripheral edge of the glass body, the heating element heating the glass body for deicing. The glass body includes a first region extending along the first side, a second region located along the first side adjacent to the first region, and a third region located along the first side adjacent to the second region on an opposite side to the first region. The heating element is disposed at least in the first region and the second region, heats the first region to higher temperatures than the second region, and heats the second region to higher temperatures than the third region.

A windshield according to a second aspect of the present invention is the windshield according to the first aspect, wherein the first region is disposed at a position corresponding to a wiper park region on the glass body.

A windshield according to a third aspect of the present invention is the windshield according to the first aspect or the second aspect, wherein the second region is disposed at a position not in the wiper park region on the glass body.

A windshield according to a fourth aspect of the present invention is the windshield according to any one of the first aspect to the third aspect, wherein a distance from the first side to a corner of the second region on a side closer to the third region and a side closer to the first side is 75 mm or less.

A windshield according to a fifth aspect of the present invention is the windshield according to any one of the first aspect to the fourth aspect, wherein an amount of heat generated per unit area of the heating element in the first region is greater than an amount of heat generated per unit area of the heating element in the second region.

A windshield according to a sixth aspect of the present invention is the windshield according to any one of the first aspect to the fifth aspect, wherein an amount of heat generated per unit area of the heating element in the second region is 1250 W/cm$^2$ or less.

A windshield according to a seventh aspect of the present invention is the windshield according to any one of the first aspect to the fourth aspect, wherein a value obtained by subtracting an amount of heat dissipation from an amount of heat generated per unit area of the heating element in the first region is greater than a value obtained by subtracting an amount of heat dissipation from an amount of heat generated per unit area of the heating element in the second region.

A windshield according to an eighth aspect of the present invention is the windshield according to any one of the first aspect to the seventh aspect, wherein an amount of heat generated per unit area of the heating element in the first region is 1200 W/cm$^2$ or greater.

A windshield according to a ninth aspect of the present invention is the windshield according to any one of the first aspect to the eighth aspect, wherein the second side is located further away from the first region than the third side. Also, the second region is located adjacent to the first region on a side of the first region closer to the second side.

A windshield according to a tenth aspect of the present invention is the windshield according to any one of the first aspect to the ninth aspect, wherein a ratio of a length of a side of the second region along the first side to a length of the first side is 0.027 or greater.

A windshield according to an eleventh aspect of the present invention is the windshield according to any one of the first aspect to the tenth aspect, wherein the heating element includes in the first region a plurality of first heating wires extending along the first side and includes in the second region a plurality of second heating wires extending along the first side.

A windshield according to a twelfth aspect of the present invention is the windshield according to the eleventh aspect, wherein a number of the first heating wires per unit length in a direction orthogonal to the first side in the first region is greater than a number of the second heating wires per unit length in the direction orthogonal to the first side in the second region.

A windshield according to a thirteenth aspect of the present invention is the windshield according to the eleventh aspect or the twelfth aspect, wherein the second heating wires have a greater wire width than the first heating wires.

A windshield according to a fourteenth aspect of the present invention is the windshield according to anyone of the eleventh aspect to the thirteenth aspect, wherein at least one outwardly disposed first heating wire of the plurality of first heating wires is connected to the second heating wires.

A windshield according to a fifteenth aspect of the present invention is the windshield according to anyone of the eleventh aspect to the fourteenth aspect, wherein the glass body further includes a fourth region extending along the second side. Also, the heating element further includes a third heating wire supplied with power from a power supply point in common with the first heating wires and the second heating wires and a fourth heating wire connected to the third heating wire and extending along the second side in the fourth region.

Also, the third heating wire has a greater wire width than the fourth heating wire.

A windshield according to a sixteenth aspect of the present invention is the windshield according to the fifteenth aspect, wherein the third heating wire is disposed surrounding the first heating wires and the second heating wires.

Advantageous Effects of Invention

According to the aspects of the present invention described above, the first region, the second region, and the third region are formed in this order along the first side of the glass body. A heating element is disposed in the first region and locally heats the first region. Also, a heating element is disposed in the second region, with the second region being heated to higher temperatures than the third region, but not being heated to higher temperatures than the first region. In other words, the second region with a temperature between that of the first region and the third region is located between the first region heated to high temperatures by the heating element and the third region with a low temperature. Thus, a gentle temperature gradient from the first region to the third region can be formed, allowing the thermal stress on the glass body at or near the peripheral edge to be reduced. Thus, damage to a glass body due to thermal stress caused by locally heating the glass body near the peripheral edge can be prevented.

DESCRIPTION OF EMBODIMENTS

A windshield according to an embodiment of the present invention will be described below with reference to the drawings.

1. Overall Configuration of Windshield

Figure 1:
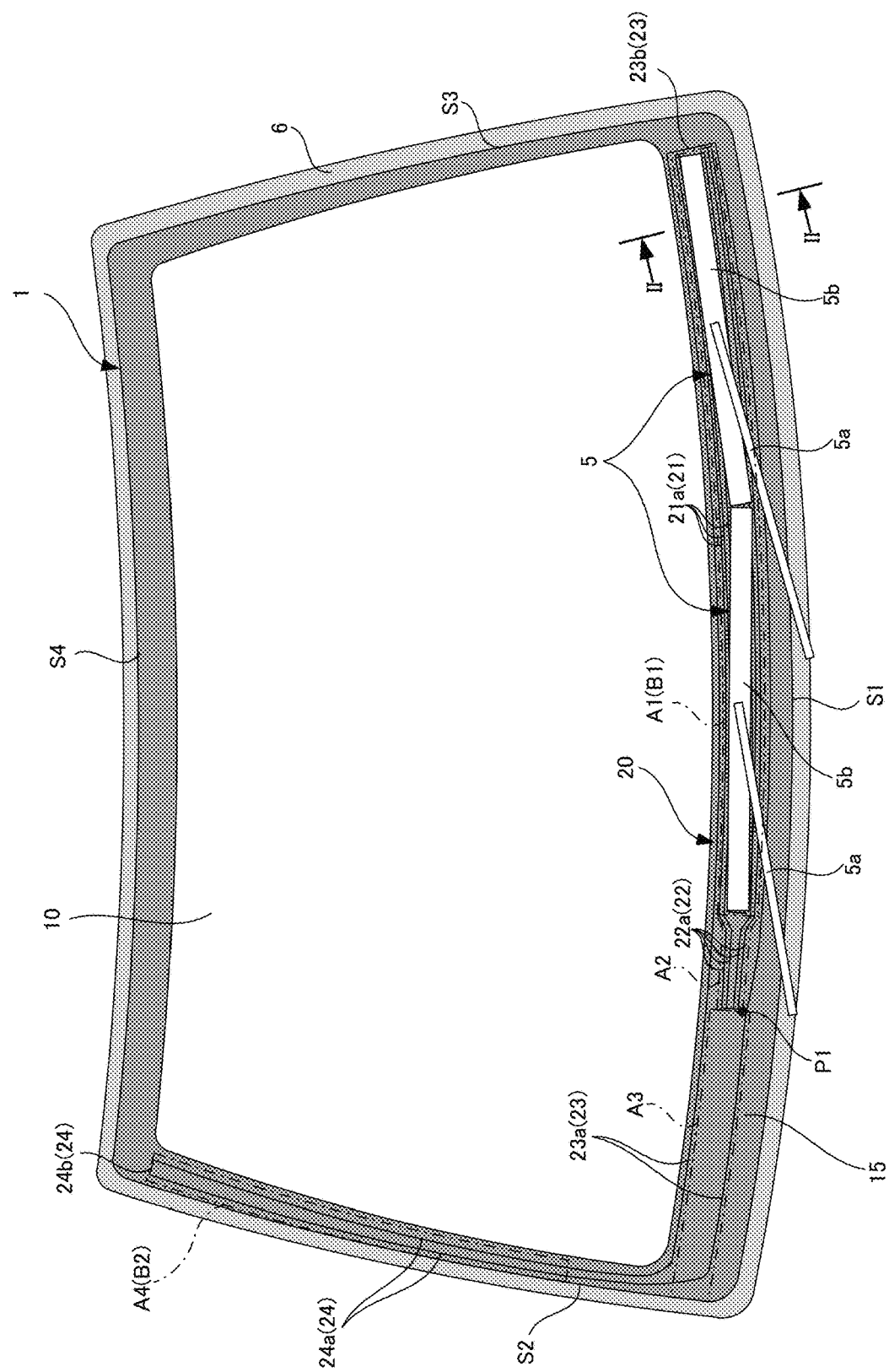
FIG. 1 is a front view of a windshield according to an embodiment of the present invention as seen from outside a vehicle.

FIG. 1 is a front view illustrating a windshield 1 according to an embodiment of the present invention. The windshield 1 is a windshield for a vehicle and is a front glass installed at the front of the vehicle. FIG. 1 is a diagram of the windshield 1 as seen from outside the vehicle. A wiper 5 is attached to the vehicle installed with the windshield 1. The wiper 5 is an assembly for wiping off deposits (dirt) that block the field of view of the driver adhered to a front surface T1 (see FIG. 2) on the vehicle outer side of a glass body 10 constituting the windshield 1. Examples of the deposits include rain, snow, frost, mud, and the like.

The wiper 5 includes a wiper arm 5a that rotates about a rotation axis located near a lower side S1 of the glass body 10 on the vehicle outer side and a wiper blade 5b attached to the leading end (end portion at the opposite side to the rotation axis) of the wiper arm 5a. The surface of the wiper blade 5b facing the front surface T1 of the glass body 10 forms the wiping surface for wiping the front surface T1 of the glass body 10. A region B1 in FIG. 1 is a region (hereinafter, referred to as a park region) on the front surface T1 of the glass body 10 where the wiper blade 5b parks when not in use. In the present embodiment, the park region is a region located to the right side along the lower side S1 of the glass body 10. A region B2 in FIG. 1 is a region (hereinafter, referred to as a wiper inverted region) on the front surface T1 of the glass body 10 reached when the wiper blade 5b is rotated approximately 90° by the rotation of the wiper arm 5a when in used. In the present embodiment, the wiper inverted region is a region located to the left side along a left side S2 of the glass body 10. Note that unless otherwise stated, up, down, left, and right used when describing the present embodiment are defined in reference to FIG. 1.

The windshield 1 is provided with a deicer. The deicer is a device that supplies power to a heating element 20 disposed on the glass body 10 and heats the glass body 10 to melt ice, snow, and frost adhered to the glass body 10 and the wiper 5. The detailed configuration of the glass body 10 and the heating element 20 will be described below in this order.

2. Configuration of Glass Body

Figure 2:
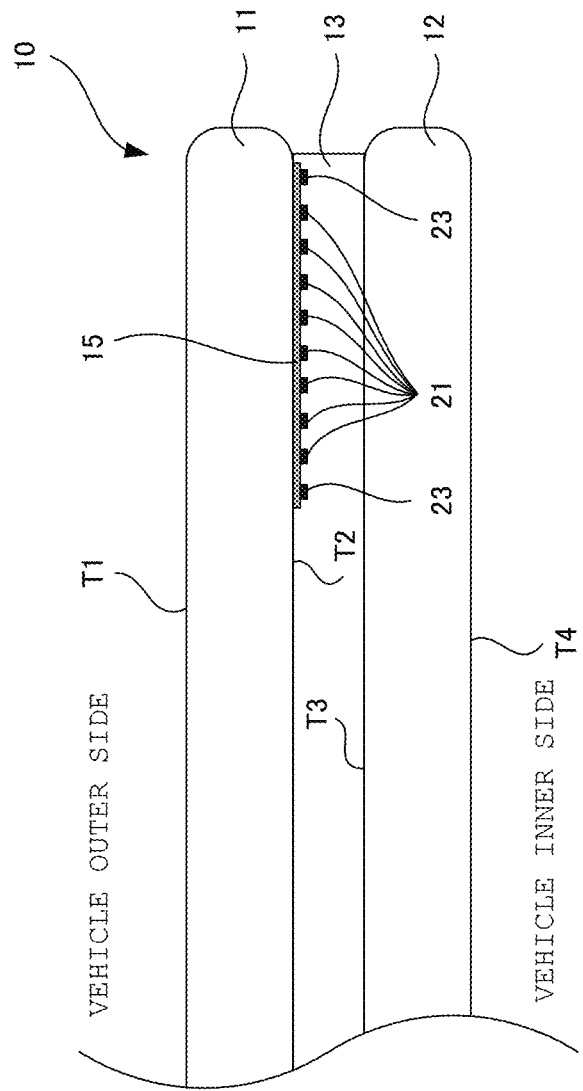
FIG. 2 is a cross-sectional view taken along line II-II of FIG. 1.

FIG. 2 is a cross-sectional view taken along line II-II of FIG. 1. As illustrated in the same drawing, the glass body 10 is laminated glass and includes a vehicle outer side glass sheet 11, a vehicle inner side glass sheet 12, and a resin interlayer film 13 inserted between the glass sheets. Note that in the description of the present embodiment, the outer surface of the glass sheet 11 is referred to as a first surface T1, the inner surface of the glass sheet 11 is referred to as a second surface T2, the inner surface of the glass sheet 12 is referred to as a third surface T4, and the outer surface of the glass sheet 12 is referred to as a fourth surface T4. The first surface T1 faces outside the vehicle, and the fourth surface T4 faces inside the vehicle. The second surface T2 and the third surface T3 face the interlayer film 13.

Returning to FIG. 1, the glass body 10 has a rectangular shape in a front view, or more accurately a trapezoidal shape, and include a peripheral edge including the lower side S1, the left side S2, a right side S3, and an upper side S4. Note that front view means looking at the windshield 1 from the vehicle outer side from a direction orthogonal to the windshield 1. The left side S2 and the right side S3 meet the lower side S1 at an angle of approximately 90° at the left and right ends of the lower side S1. The upper side S4 is a side opposite the lower side S1 and meets the left side S2 and the right side S3 at an angle of approximately 90° at the upper ends of the left side S2 and the right side S3.

A dark opaque shielding layer 15 is formed in the glass body 10 in a band-like shape along the entire peripheral edge of the glass body 10. The shielding layer 15 has the function of making the pressure-sensitive adhesive used to fix the windshield 1 to a pillar 6, i.e., window frame, of the vehicle body unable to be seen from outside the vehicle. The shielding layer 15 typically is made of glass powder or the like and is formed by screen printing a color ceramic paste, then drying and firing the product. In the present embodiment, as illustrated in FIG. 2, the shielding layer 15 is formed on the inner surface of the glass sheet 11 on the vehicle outer side, i.e., the second surface T2.

3. Configuration of Heating Element

As illustrated in FIG. 1, the heating element 20 is disposed near the peripheral edge of the glass body 10. In the present embodiment, the heating element 20 includes a first heating wire 21, a second heating wire 22, a third heating wire 23, and a fourth heating wire 24 extending along the peripheral edge of the glass body 10. The heating wires 21 to 24 in particular extend along the lower side S1 and the left side S2 of the peripheral edge of the glass body 10. As illustrated in FIGS. 1 and 2, the heating wires 21 to 24 are disposed on the shielding layer 15 formed on the second surface T2 of the glass body 10 so that the field of view of the driver is not blocked and to give an aesthetic appearance.

Figure 3:
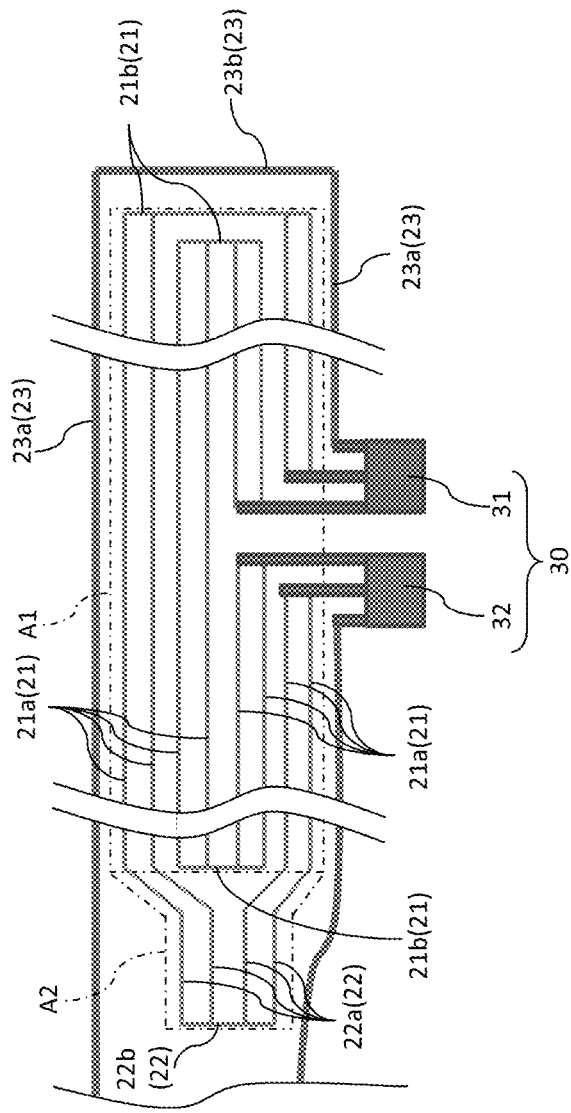
FIG. 3 is a wiring diagram of heating wires in or near a first region and a second region.

The first heating wire 21 includes a plurality of first heating wires $21a$ extending along the lower side S1 and first heating wires $21b$ that connect the first heating wires $21a$ at both ends and that extend in a direction that intersects with the lower side S1 (see FIG. 3). These heating wires $21a$ and $21b$ are disposed in a region A1 (hereinafter, referred to as a first region) that extends along the lower side S1 of the glass body 10. The first heating wire 21 primarily heats the first region A1 of the glass body 10. The first region A1 is disposed at a position corresponding to the wiper park region B1 described above. In the present embodiment, the first region A1 essentially matches the wiper park region B1. In other words, when power is supplied to heat the first heating wire 21, the wiper park region B1 is heated, resulting in the wiper blade $5b$ parked here to be heated. Note that the first region A1 is defined as the region that completely includes the first heating wire 21 in a front view. The upper boundary line of the first region A1 is defined as an imaginary line extending separated upward a predetermined distance from the uppermost first heating wire $21a$. In this example, the predetermined distance is half the distance between the uppermost first heating wire $21a$ and the adjacent first heating wire $21a$. In a similar manner, the lower boundary line of the first region A1 is defined as an imaginary line extending separated downward a predetermined distance from the lowermost first heating wire $21a$. In this example, the predetermined distance is half the distance between the lowermost first heating wire $21a$ and the adjacent first heating wire $21a$. The left and right boundary lines of the first region A1 are set as appropriate, in a manner so that the conditions described above are satisfied and the area of the first region A1 is as small as possible. Note that in the present embodiment, the upper and lower boundary lines of the first region A1 are parallel with or substantially parallel with the lower side S1 of the glass body 10, and the left and right boundary lines are parallel with or substantially parallel with the direction orthogonal to the lower side S1.

The first region A1 is located along the lower side S1 toward the right side S3, and the right end of the first region A1 substantially meets the right side S3. On the other side, a gap is formed between the left end of the first region A1 and the left side S2. In other words, the left side S2 is separated further from the first region A1 than the right side S3 is. The glass body 10 includes a second region A2 and a third region A3 to the left of the first region A1. The second region A2 is located along the lower side S1 next to the first region A1 on the left, i.e., towards the left side S2. The third region A3 is located along the lower side S1 next to the second region A2 on the left, i.e., the opposite side to the first region A1 and toward the left side S2. Note that, in a similar manner to the first region A1, the second region A2 is defined as the region that completely includes the second heating wire 22 in a front view. In the present embodiment, the right boundary line of the second region A2 corresponds with the left boundary line of the first region A1. Also, the third region A3 is a region that occupies the same position in the height direction as the first region A1. Here, the height direction refers to the direction orthogonal to the lower side S1. The right boundary line of the third region A3 corresponds with the left boundary line of the second region A2, and the left boundary line of the third region A3 corresponds to the left side S2 of the glass body 10.

Here, the length of the lower side S1 is defined as L0, and the lengths along the lower side S1 of the first region A1, the second region A2, and the third region are defined as L1, L2, and L3, respectively. When taking into account the wiping region of the wiper 5, preferably 0.50 L1/L0 holds true, more preferably 0.60 L1/L0 holds true, and even more preferably 0.73 L1/L0 holds true. Also, from the perspective of forming the temperature gradient in the glass body 10 as described below, preferably 0.027 L2/L0 holds true, more preferably 0.033 L2/L0 holds true, and even more preferably 0.050 L2/L0 holds true. Also, from the perspective of preventing excessive thermal stress on the glass body 10, preferably L1/L0 0.90 holds true, more preferably L1/L0 0.85 holds true, and even more preferably L1/L0 0.80 holds true. Furthermore, if L2 is too long, a temperature gradient such as that described below is difficult to obtain in the central region of the second region A2. Thus, excess amounts of the second region A2 are not necessary in terms of functioning to help obtain such a temperature gradient. Taking this into account, preferably L2/L0 0.20 holds true, and more preferably L2/L0 0.15 holds true.

FIG. 3 is a wiring diagram of the heating wires 21 to 23 in or near the first region A1 and the second region A2 according to the present embodiment. The second heating wire 22 is disposed in the second region A2 and primarily heats the second region A2 of the glass body 10. The second heating wire 22 includes a plurality of second heating wires 22a extending along the lower side S1 and a second heating wire 22b that connects the second heating wires 22a at the left ends and that extends in a direction that intersects with the lower side S1. In the present embodiment, the second region A2 is located outside of the wiper park region B1 and does not overlap with the wiper park region B1. In a similar manner, the third region A3 is also located outside of the wiper park region B1 and does not overlap with the wiper park region B1.

Note that when the heating wires 21 to 24 are disposed near urethane resin pressure-sensitive adhesive or the like used for fixing the glass body 10 to the pillar 6, the pressure-sensitive adhesive may be degraded. Thus, the heating wires 21 to 24 are desirably disposed at a position separated away from pressure-sensitive adhesives. Also, note that pressure-sensitive adhesives are typically applied up to a position approximately 2 mm away from the peripheral edge of the glass body 10, with a maximum of up to 10 mm away. However, to ensure that the field of view of the driver is not blocked, the shielding layer 15 on which the heating wires 21 to 24 are disposed is desirably as narrow as possible. In the present embodiment, the length, in the direction orthogonal to the lower side S1, of the portion of the shielding layer 15 along the lower side S1 is from 100 mm to 200 mm, and the length, in the direction orthogonal to the lower side S1, of the first region A1 and the second region A2 is 100 mm or less. To satisfy these constraints, the distance from the lower side S1 to a corner P1 (see FIG. 1) of the second region A2 on the third region A3 side and the lower side S1 side is preferably 75 mm or less, more preferably 50 mm or less, and even more preferably 40 mm or less. However, the closer the corner P1 is to the lower side S1, the higher the thermal stress on the glass body 10 is. This problem is solved by the gentle temperature gradient described below in the second region A2.

The heating wires 21 and 22 primarily heat the wiper park region B1, and the first region A1 is heated to higher temperatures than the second region A2. In the present embodiment, a wire width W1 of the first heating wire 21 and a wire width W2 of the second heating wire 22 are the same. Wire width refers to the maximum width of a cross-section of the direction the heating wire extends. When the wire width is not uniform, the average wire width is taken. To generate the required amount of heat in the first region A1 and the second region A2, the wire width needs to be thin. Typically, 0.4 mm≤W1=W2≤1.2 mm holds true, and in the present embodiment, W1=W2=0.7 mm holds true.

Also, in the present embodiment, the number of first heating wires 21a extending along the lower side S1 (eight in the example illustrated in FIG. 3) is greater than the number of second heating wires 22a extending along the lower side S1 (four in the example illustrated in FIG. 3). Also, the number of first heating wires 21a per unit length in the height direction in the first region A1 is greater than the number of second heating wires 22a per unit length in the height direction in the second region A2.

Also, in the present embodiment, an amount of heat generated H1 per unit area of the heating element 20 in the first region A1 is greater than an amount of heat generated H2 per unit area of the heating element 20 in the second region A2. H1 is value obtained by dividing the amount of heat generated by the heating element 20 disposed in the first region A1 by the area of the first region A1. In a similar manner, H2 is value obtained by dividing the amount of heat generated by the heating element 20 disposed in the second region A2 by the area of the second region A2. Note that from the perspective of preventing freezing, H1≥1200 W/cm² preferably holds true, H1 1400 W/cm² more preferably holds true, and H1≥1600 W/cm² even more preferably holds true. From the perspective of reducing the thermal stress on the glass body 10 and preventing damage to the glass body, H1≥2500 W/cm² preferably holds true, H1≤2300 W/cm² more preferably holds true, and H1≤2200 W/cm² even more preferably holds true. Also, from the perspective of obtaining a gentle temperature gradient between the first region A1 and the second region A2, H2≥600 W/cm² preferably holds true, H2≥700 W/cm² more preferably holds true, and H2≥800 W/cm² even more preferably holds true. Also, from the perspective of obtaining a gentle temperature gradient from the first region A1 through the second region A2 to the third region A3, H2≤1250 W/cm² preferably holds true, H2≤1150 W/cm² more preferably holds true, and H2≤1100 W/cm² even more preferably holds true.

The configuration described above specifies a wiring pattern in which the first region A1 is heated to higher temperatures than the second region A2 when the heating element 20 generates heat. Also, as illustrated in FIG. 1, no heating wires are disposed in the third region A3 except for a portion of the third heating wire 23. Thus, the third region A3 is hardly heated when the heating element 20 generates heat, allowing the second region A2 to be heated to higher temperatures than the third region A3. In other words, when the heating element 20 generates heat, the second region A2 with a temperature between that of the first region A1 and the third region A3 is located between the first region A1 with a high temperature and the third region A3 with a low temperature. Thus, a gentle temperature gradient from the first region A1 to the third region A3 can be formed, allowing the thermal stress on the glass body 10 at or near the lower side S1 to be reduced. This prevents the glass body 10 being damaged by heat, despite the first region A1 being locally heated at or near the peripheral edge of the glass body 10.

The first heating wire 21 and the second heating wire 22 are supplied with power from a common single power supply point 30. In the present embodiment, the power supply point 30 is disposed below the central region in the left-and-right direction of the first heating wire 21 and includes a positive and negative pair of electrode substrates 31 and 32. The heating wires 21 and 22 are formed in a plurality of closed loops via the power supply point 30, and when a voltage is applied between the electrode substrates 31 and 32, current flows and heat is generated. The closed loops are shaped like ripples with inner loops being surrounded by outer loops. However, at least two of the loops are connected at the left and right ends. Specifically, the three first heating wires 21b each connect at least two first heating wires 21*a*, and one second heating wire 22*b* connects all of the second heating wires 22*a*.

As illustrated in FIG. 3, the second heating wires 22*a* are each connected to a heating wire, from among the plurality of first heating wires 21*a*, disposed on the upper or lower outer side. In other words, the inner loops are formed of the first heating wire 21 only, and the outer loops are formed of the first heating wire 21 and the second heating wire 22 connected together. In the present embodiment, the heating wires that form a closed loop are disposed in parallel with respect to the power supply point 30. Thus, the supplied voltage is the same. Thus, the greater the length of the heating wire that forms a closed loop, the more resistance in the heating wire. This makes the current value smaller and decreases the amount of heat generated per unit length. Thus, in the first region A1, the amount of heat generated decreases from the central region outward in the direction orthogonal to the lower side S1, and a gentle temperature gradient is formed in the same direction. This allows the thermal stress on the glass body 10 at or near the lower side S1 to be further reduced and damage to the glass body 10 to be prevented.

The fourth heating wire 24 includes a plurality of fourth heating wires 24*a* (two in the present embodiment) extending along the left side S2 and a fourth heating wire 24*b* that connects the fourth heating wires 24*a* at the upper ends and that extends in a direction that intersects with the left side S2. These heating wires 24*a* and 24*b* are disposed in a region A4 (hereinafter, referred to as a fourth region) that extends along the left side S2 of the glass body 10. The fourth heating wire 24 primarily heats the fourth region A4 of the glass body 10. The fourth region A4 is disposed at a position corresponding to the wiper inverted region B2 described above. In the present embodiment, the fourth region A4 essentially matches the wiper inverted region B2. In other words, when power is supplied to heat the fourth heating wire 24, the wiper inverted region B2 is heated, and the ice, snow, frost, and the like collected in the region by the rotation of the wiper blade 5*b* are heated. Note that the fourth region A4 is defined as the region that completely includes the fourth heating wire 24 in a front view as described below. The left boundary line of the fourth region A4 is defined as an imaginary line extending separated to the left a predetermined distance from the leftmost fourth heating wire 24*a*. In this example, the predetermined distance is half the distance between the leftmost fourth heating wire 24*a* and the adjacent fourth heating wire 24*a*. In a similar manner, the right boundary line of the fourth region A4 is defined as an imaginary line extending separated to the right a predetermined distance from the rightmost fourth heating wire 24*a*. In this example, the predetermined distance is half the distance between the rightmost fourth heating wire 24*a* and the adjacent fourth heating wire 24*a*. The upper and lower boundary lines of the fourth region A4 are set as appropriate, in a manner so that the conditions described above are satisfied and the area of the fourth region A4 is as small as possible. Note that in the present embodiment, the left and right boundary lines of the fourth region A4 are parallel with or substantially parallel with the left side S2 of the glass body 10.

The third heating wire 23 primarily includes a plurality of third heating wires 23*a* (two in the example illustrated in FIG. 1) extending along the lower side S1 and a third heating wire 23*b* that connects the third heating wires 23*a* at the right ends and that extends in a direction that intersects with the lower side S1. The third heating wires 23*a* extend along the lower side S1 from at or near the right end of the lower side S1, then turn approximately 90° at or near the bottom left corner of the glass body 10 and extend along the left side S2 to the fourth region A4. The heating wires 23*a* and 23*b* are disposed surrounding the first heating wire 21 and the second heating wire 22 and, in the present embodiment, are disposed surrounding the first region A1 and the second region A2. Also, the heating wires 23*a* extend in the direction the third region A3 extends, with a portion being disposed in the third region A3. In this way, the third heating wires 23*a* heat the third region A3 of the glass body 10. However, in the present embodiment, only a small number of the third heating wires 23*a* are disposed in the third region A3 (one in the example illustrated in FIG. 1), and a wire width W3 of the third heating wire 23 is greater than the wire widths W1 and W2 of the first and second heating wires. Thus, the third heating wires 23*a* do not significantly contribute to increasing the temperature of the third region A3. This is because, as described below, the third heating wire 23 is a wire for transmitting power to the fourth heating wire 24 and its function is not to heat the glass body 10. Thus, to reduce power loss in the third heating wire 23, which is a power-transmitting wire, 1.25 mm≤W3 preferably holds true, 1.5 mm≤W3 more preferably holds true, and 2.0 mm≤W3 even more preferably holds true. Also, if W3 is too great, the printing of the third heating wire 23 may be incomplete and the coloring of the material (typically, silver) of the third heating wire 23 is degraded. Thus, to prevent this, W3≤15 mm preferably holds true, W3≤13 mm more preferably holds true, and W3≤11 mm even more preferably holds true.

Also, with the configuration described above, the third heating wire 23 surrounds from the outside the first heating wire 21 and the second heating wire 22 which have higher heating capacity and does not contribute to increasing the temperature of the glass body 10 as much as the heating wires 21 and 22. Thus, in the peripheral region of the first region A1 and the second region A2, the amount of heat generated decreases from the central region outward in the direction orthogonal to the lower side S1, and a gentle temperature gradient is formed in the same direction. This allows the thermal stress on the glass body 10 at or near the lower side S1 to be further reduced and damage to the glass body 10 to be prevented.

The fourth heating wire 24 is connected to the third heating wire 23, and the heating wires 23 and 24 are both supplied with power from the same single power supply point 30 that supplies the first heating wire 21 and the second heating wire 22. In other words, the power supply point 30 is shared by the heating wires 21 to 24. This reduces cost, increases flexibility in design relating to the spatial arrangement of the power supply point disposed along the lower side S1, and easily prevents interference with other electronic devices. The heating wires 23 and 24 are formed in a closed loop via the power supply point 30, and when a voltage is applied between the electrode substrates 31 and 32, current flows and heat is generated.

The wire width W3 of the third heating wire 23 is greater than a wire width W4 of the fourth heating wire 24. This allows power to be efficiently transmitted from the power supply point 30, via the third heating wire 23, to the fourth heating wire 24 where it is efficiently consumed. Also, in the present embodiment, the interval between the fourth heating wires 24*a* (when the interval is not uniform, the average interval is taken) is narrower than the interval between the third heating wires 23*a* (when the interval is not uniform, the average interval is taken). This helps promote temperature increase in the fourth region A4.

4. Modified Example

An embodiment of the present invention was described above. However, the present invention is not limited to the embodiment described above, and various changes can be made without departing from the scope of the present invention. For example, the following changes can be made. Also, the following modified examples can be combined as appropriate.

4-1

In the embodiment described above, the heating element 20 is disposed overlapped with the shielding layer 15. However, the heating element 20 may be disposed out from the shielding layer 15 at or near the peripheral edge of the glass body 10.

4-2

Figure 4:
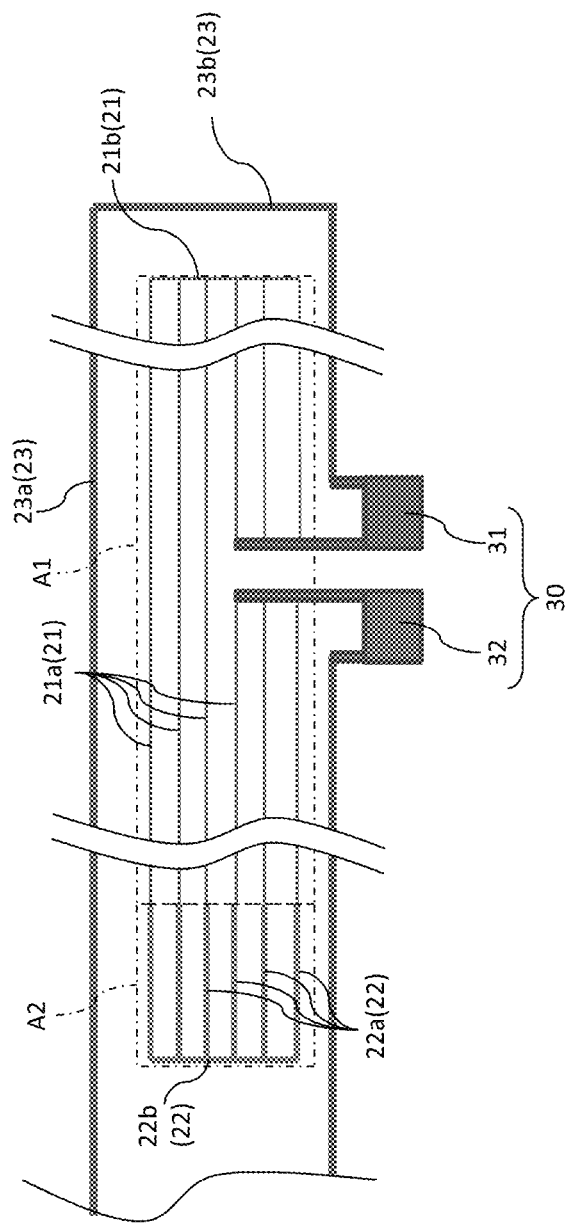
FIG. 4 is a wiring diagram of heating wires in or near a first region and a second region according to a modified example.

The configuration of the heating wires of the heating element 20 are not limited to that described above. For example, as illustrated in FIG. 4, the wire width W2 of the second heating wire 22 may be greater than the wire width W1 of the first heating wire 21. In this example, the first region A1 can be heated to higher temperatures than the second region A2 even when one or more of the conditions described above are not satisfied, the conditions relating to the number (absolute number) of heating wires 21a and 22a and the number of heating wires 21a and 22a per unit length in both regions A1 and A2 and the like. To achieve this, 0.3 mm≤W1≤1.0 mm and 0.7≤W2≤3.5 mm preferably hold true. For example, W1 can be set to 0.7 mm, and W2 can be set to 1.5 mm.

Figure 5:
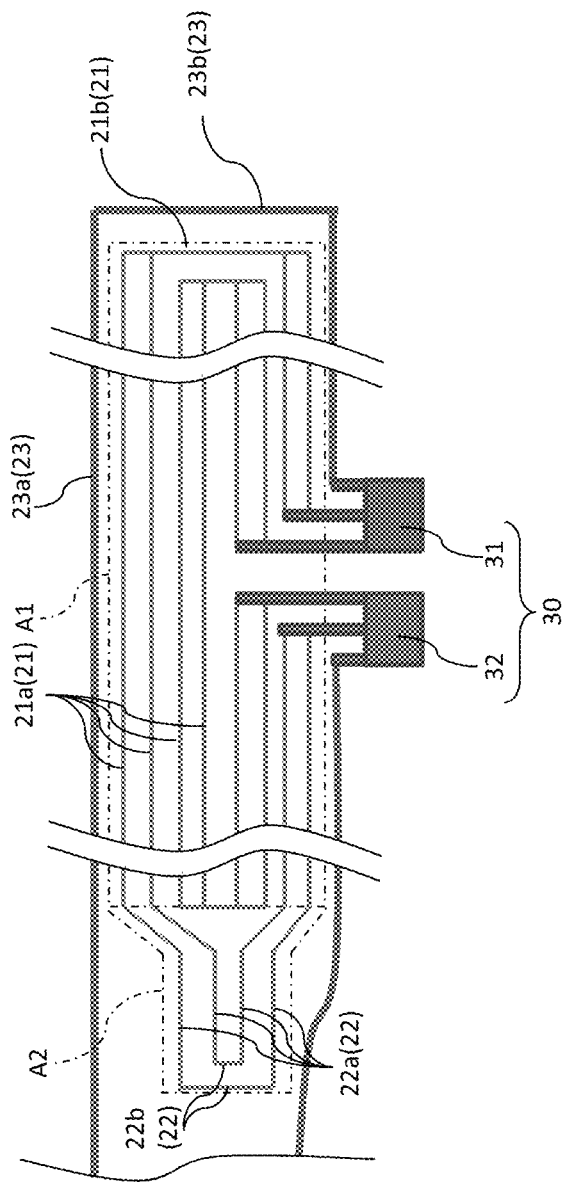
FIG. 5 is a wiring diagram of heating wires in or near a first region and a second region according to another modified example.

Also, instead of or in addition to the changes described above, the method of connecting the first heating wires 21a and the method of connecting the second heating wires 22a are not limited to that described above. For example, as illustrated in FIG. 5, the second heating wires 22a may be connected by two second heating wires 22b.

4-3

The heating element 20 may include a film-like heating element made from ITO, FTO, or the like instead of or in addition to the heating wire.

4-4

Figure 6:
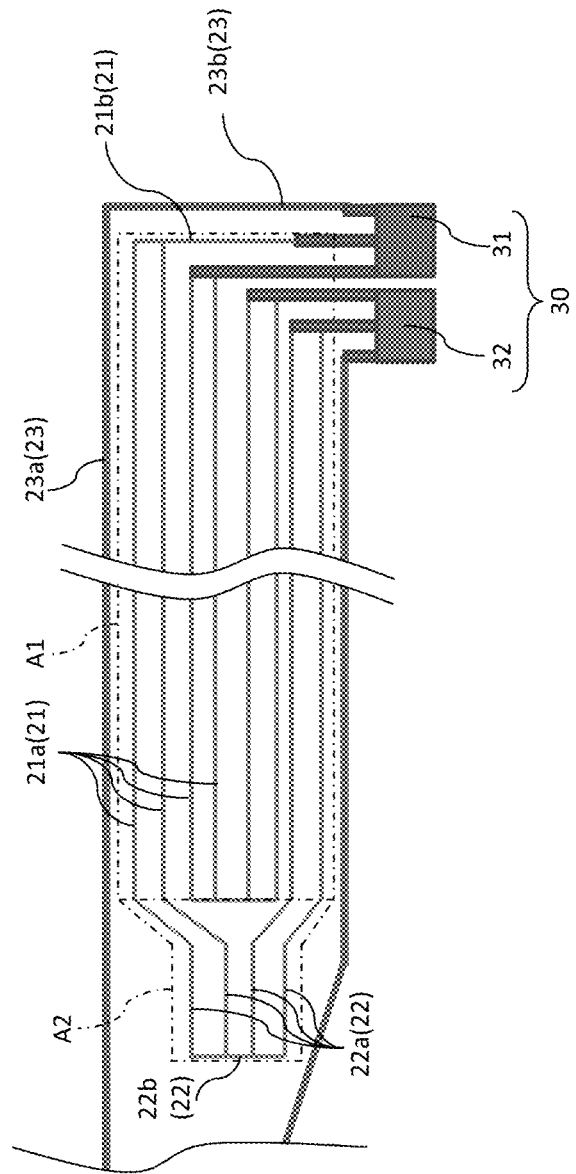
FIG. 6 is a wiring diagram of heating wires in or near a first region and a second region according to yet another modified example.
Figure 7:
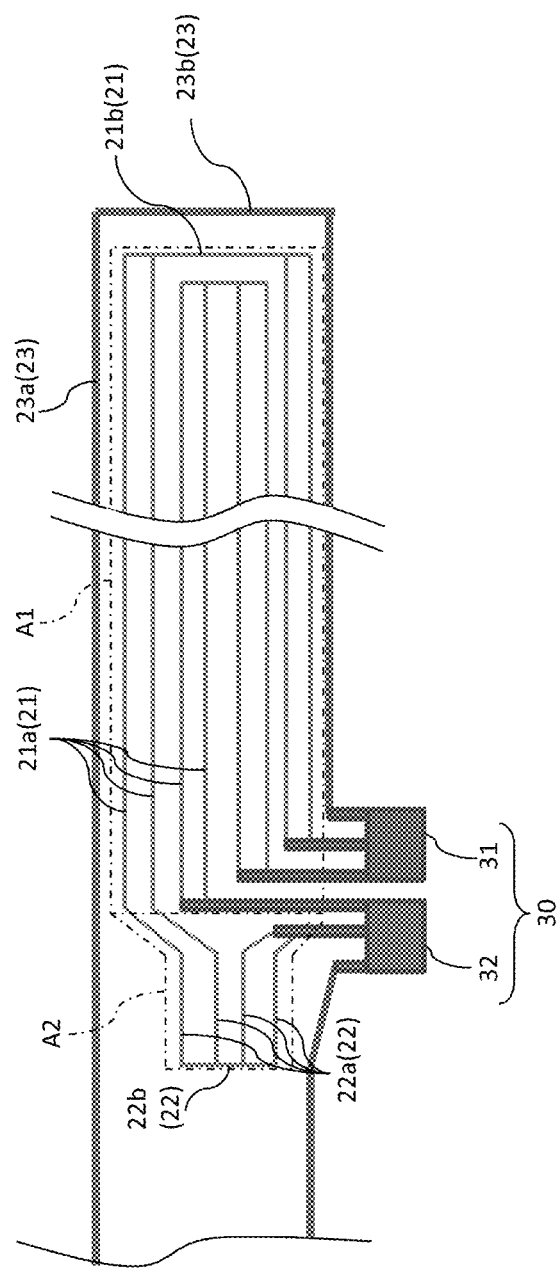
FIG. 7 is a wiring diagram of heating wires in or near a first region and a second region according to yet another modified example.
Figure 8:
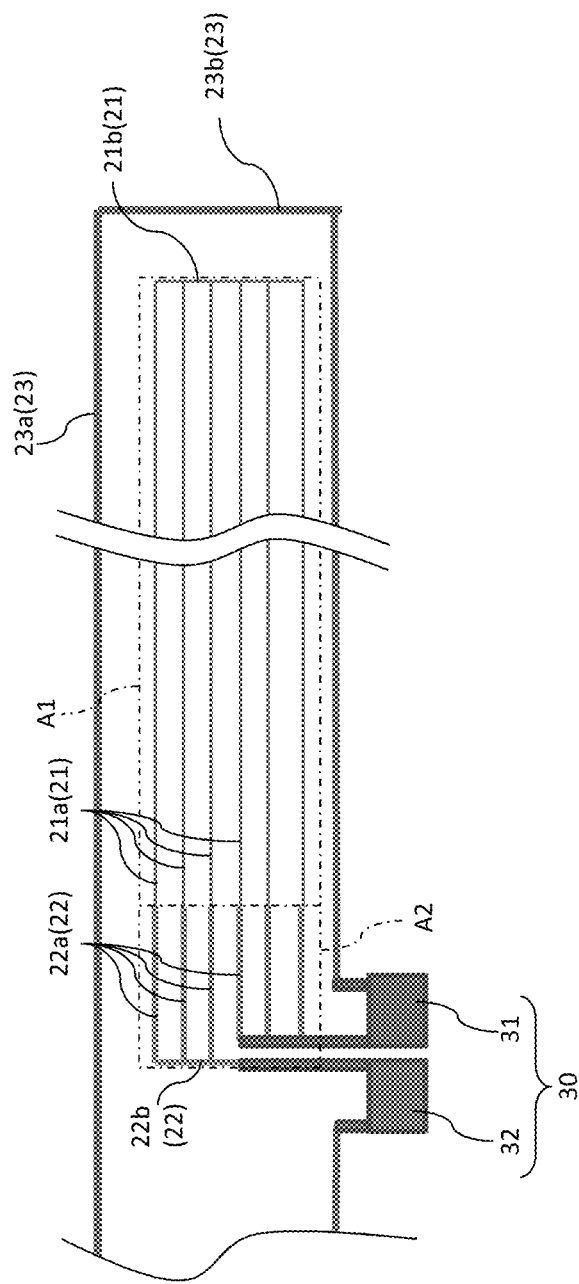
FIG. 8 is a wiring diagram of heating wires in or near a first region and a second region according to yet another modified example.

The position of the power supply point 30 is not limited to that described above. For example, the power supply point 30 can be disposed at or near the right end of the first region A1 (see FIG. 6), can be disposed at or near the boundary between the first region A1 and the second region A2 (see FIG. 7), or can be disposed at or near the left end of the second region A2 (see FIG. 8). Also, the number of power supply points is not limited to that described above, and a single power supply point may not be shared by one or more of the heating wires 21 to 24.

4-5

In the embodiment described above, the second region A2, a temperature transition region, is formed only to the left of the first region A1. However, instead of or in addition to this, a temperature transition region similar to the second region A2 may be formed to the right of the first region A1.

4-6

In the embodiment described above, the amount of heat generated H1 per unit area of the heating element 20 in the first region A1 is greater than the amount of heat generated H2 per unit area of the heating element 20 in the second region A2. However, the present invention is not limited to this configuration, and a discretionary configuration may be used, as long as the first region A1 is heated to higher temperatures than the second region A2 and a gentle temperature gradient is formed surrounding the first region A1.

Figure 9:
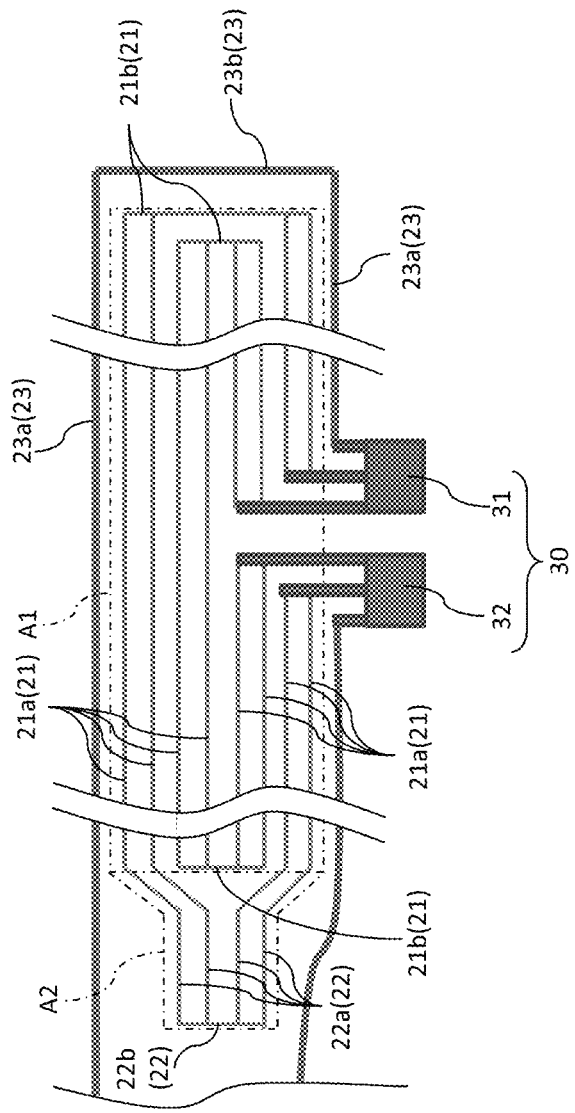
FIG. 9 is a wiring diagram of heating wires in or near a first region and a second region according to yet another modified example.

For example, in a case such as when the amount of heat generated per unit area is the same but the amount of heat dissipation per unit area is less in one region, the value of the amount of heat generated per unit area minus the amount of heat dissipation is greater in that region, allowing that region to be heated to higher temperatures. Such an example is illustrated in FIG. 9. In this example, the first region A1 and the second region A2 have the same interval between heating wires (the number of heating wires per unit length in the direction orthogonal to the heating wires) and the same heating wire width, thus the amount of heat generated per unit area is essentially equal, i.e., H1=H2. However, in the second region A2, two heating wires are omitted on both the upper and lower side, these heating wires corresponding to the heating wires disposed on the upper and lower outer sides of the first region A1. This makes heat generated in the second region A2 easier to escape, and thus the temperature in the second region A2 tends to be lower than the temperature in the first region A1. In this way the first region A1 is heated to higher temperatures than the second region A2.

Examples

Figure 10A:
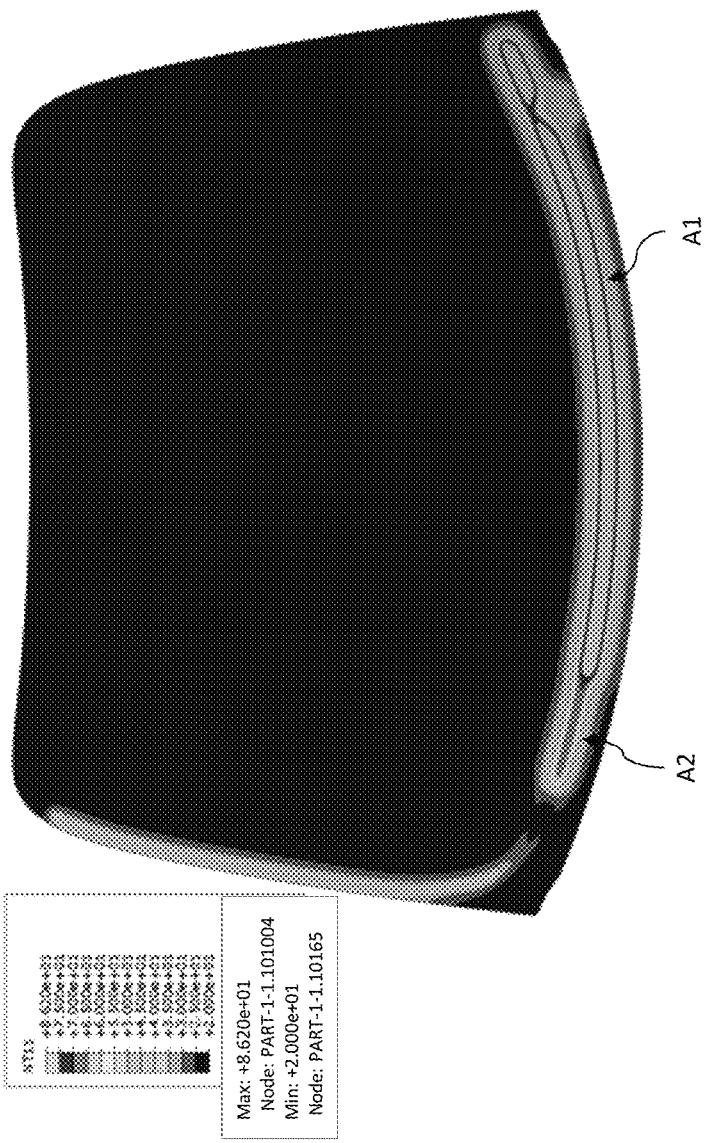
FIG. 10A is a temperature distribution diagram of a glass body according to an Example.
Figure 10B:
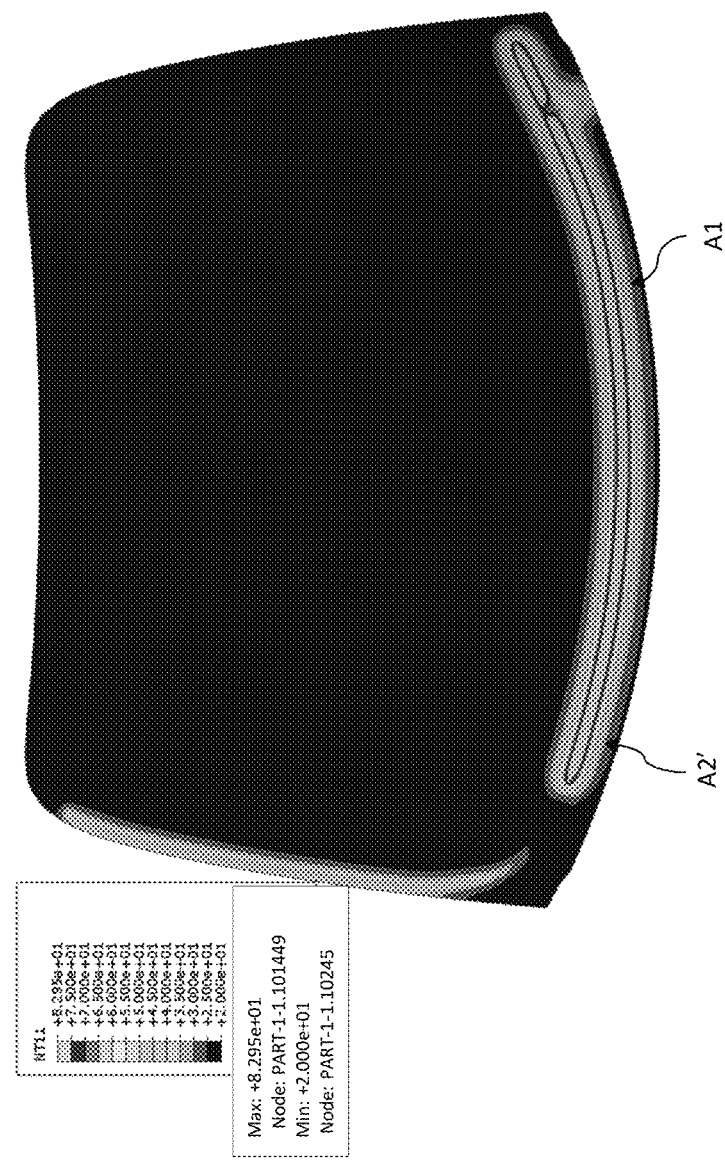
FIG. 10B is a temperature distribution diagram of a glass body according to a Comparative Example.
Figure 11A:
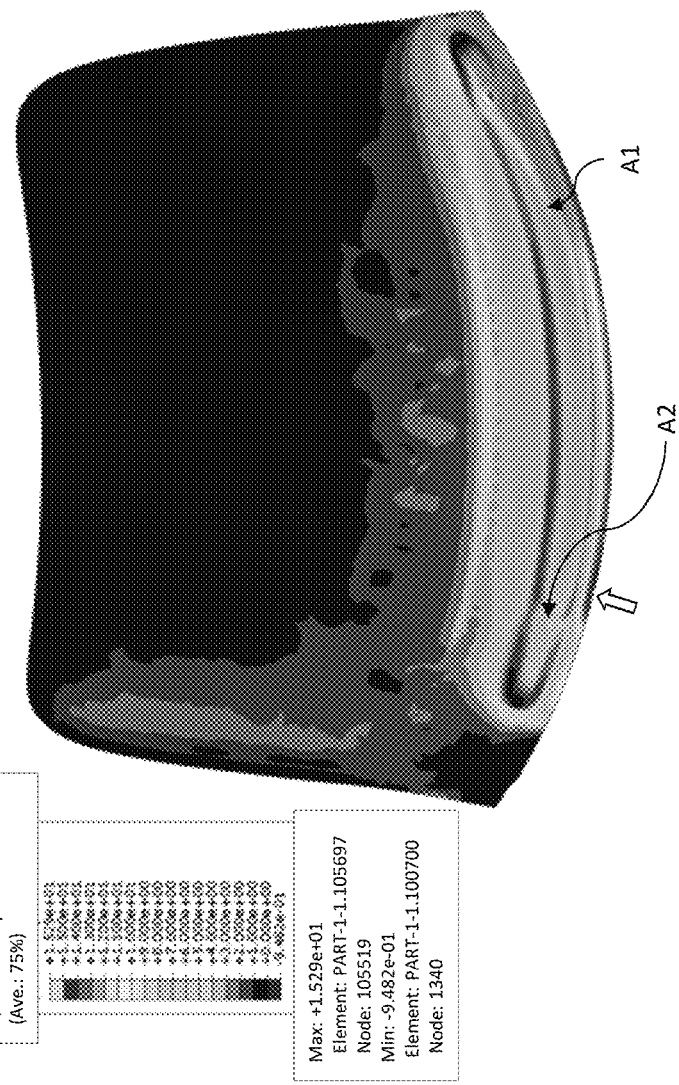
FIG. 11A is a thermal stress diagram of a glass body according to an Example.
Figure 11B:
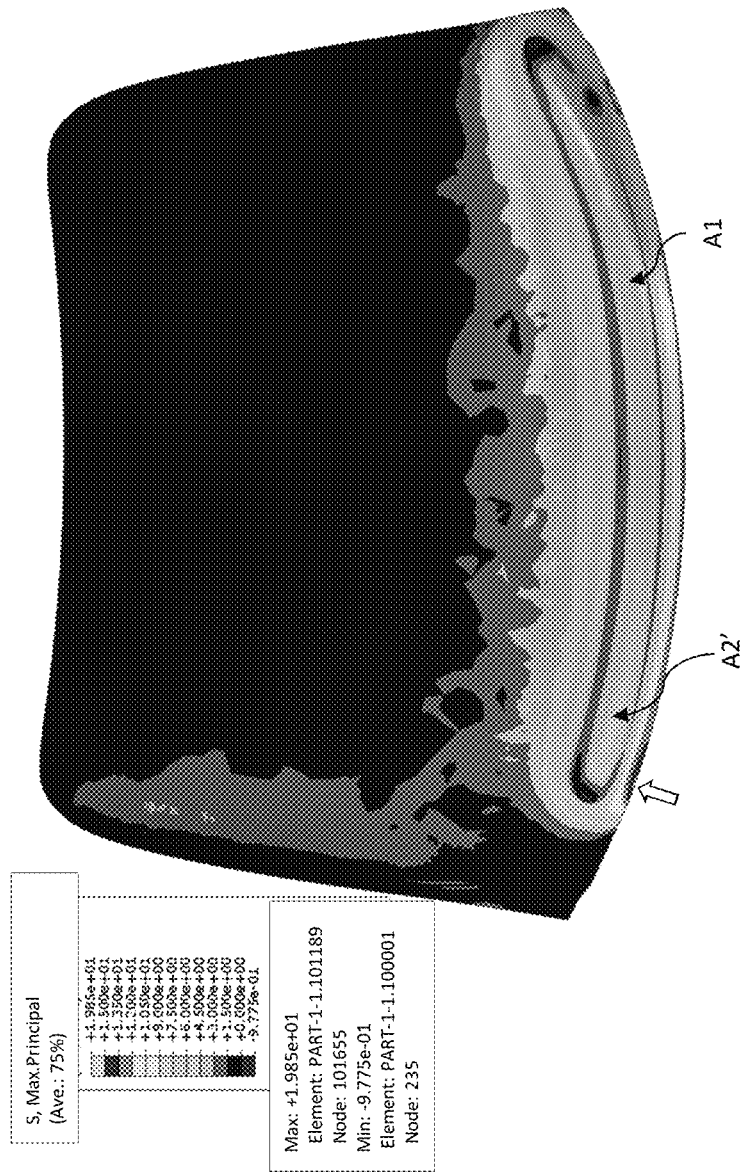
FIG. 11B is a thermal stress diagram of a glass body according to a Comparative Example.

The inventors prepared a glass body, similar to that of Modified Example 4-6, formed with the first region A1, a high temperature region, and the second region A2, a temperature transition region to the left of the first region A1, as an Example. Also, the inventors prepared, as a Comparative Example, a glass body similar to that of the Example except that the glass body includes a second region A2' with the heating wires disposed at positions in the left-and-right direction of the second region A2 in a similar pattern to that of the first region A1. Then, a temperature distribution and a thermal stress distribution on the glass body according to the Example and the Comparative Example were obtained via simulation. FIG. 10A shows the result of the temperature distribution of the Example. FIG. 10B shows the result of the temperature distribution of the Comparative Example. FIG. 11A shows the result of the thermal stress distribution of the Example. FIG. 11B shows the result of the thermal stress distribution of the Comparative Example.

As can be seen in FIG. 10A, in the Example, the second region A2 has been heated to a temperature less than that of the first region A1. On the other hand, FIG. 10B shows us that in the Comparative Example, the second region A2' has been heated to the same temperature as the first region A1. Note that the unit in the legend of FIGS. 10A and 10B is ° C.

In FIGS. 11A and 11B, for the Example and the Comparative Example, the region of the glass body of maximum thermal stress is indicated by the black outline arrow. As can be seen from the drawings, the maximum value of the thermal stress found for the Example is +1.529e+01 at a position along the lower side of the glass body in a region below the boundary between the first region A1 and the second region A2. On the other hand, the maximum value of the thermal stress found for the Comparative Example reached +1.985e+01 at a position along the lower side of the glass body in a region below the second region A2'. Note that the unit in the legend of FIGS. 11A and 11B is MPa.

From the results described above, it can be seen that in the Example, due to the second region A2, a temperature gradient is formed to the left of the first region A1 which is more gentle than that of the Comparative Example and the thermal stress at or near the peripheral edge of the glass body is less (in other words, thermal breakage in the glass body is less likely) than that in the Comparative Example.

LIST OF REFERENCE NUMERALS

1 Windshield
5 Wiper
10 Glass body
20 Heating element
21 First heating wire
22 Second heating wire
23 Third heating wire
24 Fourth heating wire
30 Power supply point
A1 First region
A2 Second region
A3 Third region
A4 Fourth region
B1 Wiper park region
B2 Wiper inverted region
S1 Lower side (first side)
S2 Left side (second side)
S3 Right side (third side)
S4 Upper side (fourth side)
P1 Corner

The invention claimed is:

1. A windshield, comprising:
a glass body with a rectangular shape including a peripheral edge that includes a first side and a second side and a third side, the second side and the third side meeting the first side; and
a heating element disposed at or near the peripheral edge of the glass body, the heating element heating the glass body for deicing,
wherein
the glass body includes a first region extending along the first side, a second region located along the first side adjacent to the first region, and a third region located along the first side adjacent to the second region on an opposite side to the first region,
the first region is located in a vicinity of the third side, and
the heating element is disposed at least in the first region and the second region, heats the first region to higher temperatures than the second region, and heats the second region to higher temperatures than the third region.

2. The windshield according to claim 1, wherein the first region is disposed at a position corresponding to a wiper park region on the glass body.

3. The windshield according to claim 1, wherein the second region is disposed at a position not in the wiper park region on the glass body.

4. The windshield according to claim 1, wherein a distance from the first side to a corner of the second region on a side closer to the third region and a side closer to the first side is 75 mm or less.

5. The windshield according to claim 1, wherein an amount of heat generated per unit area of the heating element in the first region is greater than an amount of heat generated per unit area of the heating element in the second region.

6. The windshield according to claim 1, wherein an amount of heat generated per unit area of the heating element in the second region is 1250 $W/cm^2$ or less.

7. The windshield according to claim 1, wherein a value obtained by subtracting an amount of heat dissipation from an amount of heat generated per unit area of the heating element in the first region is greater than a value obtained by subtracting an amount of heat dissipation from an amount of heat generated per unit area of the heating element in the second region.

8. The windshield according to claim 1, wherein an amount of heat generated per unit area of the heating element in the first region is 1200 $W/cm^2$ or greater.

9. The windshield according to claim 1, wherein
the second side is located further away from the first region than the third side, and
the second region is located adjacent to the first region on a side of the first region closer to the second side.

10. The windshield according to claim 1, wherein a ratio of a length of a side of the second region along the first side to a length of the first side is 0.027 or greater.

11. The windshield according to claim 1, wherein the heating element includes in the first region a plurality of first heating wires extending along the first side and includes in the second region a plurality of second heating wires extending along the first side.

12. The windshield according to claim 11, wherein a number of the first heating wires per unit length in a direction orthogonal to the first side in the first region is greater than a number of the second heating wires per unit length in the direction orthogonal to the first side in the second region.

13. The windshield according to claim 11, wherein the second heating wires have a greater wire width than the first heating wires.

14. The windshield according to claim 11, wherein at least one outwardly disposed first heating wire of the plurality of first heating wires is connected to the second heating wires.

15. The windshield according to claim 11, wherein
the glass body further includes a fourth region extending along the second side,
the heating element further includes a third heating wire supplied with power from a power supply point in common with the first heating wires and the second heating wires and a fourth heating wire connected to the third heating wire and extending along the second side in the fourth region, and
the third heating wire has a greater wire width than the fourth heating wire.

16. The windshield according to claim 15, wherein the third heating wire is disposed surrounding the first heating wires and the second heating wires.

17. The windshield according to claim 1, wherein if a length of the first side is defined as L0, and a length of the first region along the first side is defined as L1, then $0.50 \leq L1/L0 \leq 0.9$.

* * * * *